US012526369B2

(12) United States Patent
Andersen et al.

(10) Patent No.: US 12,526,369 B2
(45) Date of Patent: Jan. 13, 2026

(54) WIRELESS REGISTRATION OF DEVICES WITH AND HANDLING OF PROFILES IN AN INTERCOM SYSTEM

(71) Applicant: Robert Bosch GmbH, Stuttgart (DE)

(72) Inventors: James Richard Andersen, Lincoln, NE (US); Jason Larry Brchan, Omaha, NE (US); Jeffrey Brede, Greendale, IN (US); David Sean McKinnon, Newmarket (CA); Kevin Brian Moore, Chaska, MN (US)

(73) Assignee: Robert Bosch GmbH, Stuttgart (DE)

( * ) Notice: Subject to any disclaimer, the term of this patent is extended or adjusted under 35 U.S.C. 154(b) by 252 days.

(21) Appl. No.: 18/344,256

(22) Filed: Jun. 29, 2023

(65) Prior Publication Data

US 2025/0008024 A1     Jan. 2, 2025

(51) Int. Cl.
*H04M 11/02* (2006.01)
*H04W 48/20* (2009.01)
(Continued)

(52) U.S. Cl.
CPC ........... *H04M 11/02* (2013.01); *H04W 48/20* (2013.01); *H04W 76/10* (2018.02); *H04W 88/02* (2013.01)

(58) Field of Classification Search
None
See application file for complete search history.

(56) References Cited

U.S. PATENT DOCUMENTS 8,861,744 B1    10/2014    Solomon et al.
8,989,767 B2    3/2015    Walker
(Continued)

FOREIGN PATENT DOCUMENTS

RU    2756699 C1    10/2021
WO    2015149734 A1    10/2015
WO    2022267561 A1    12/2022

OTHER PUBLICATIONS

Rackley, "Wireless networking technology: From principles to successful implementation," excerpt from section entitled "Media access and link control layer," 2007, pp. 276-278.
(Continued)

*Primary Examiner* — Hemant S Patel
(74) *Attorney, Agent, or Firm* — Michael Best & Friedrich LLP (57) ABSTRACT

An intercom system including an intercom network, a user panel, and a wireless access point. The user panel includes a user panel wireless transceiver, a user panel short range communication transceiver, and a user panel electronic controller. The wireless access point communicatively coupled with the intercom network via a first intercom interface, the wireless access point includes an access point wireless transceiver, an access point short range communication transceiver, and an access point electronic controller. The access point electronic controller receives a user input to begin a registration mode, detects a first beacon signal via the access point short range communication transceiver, determines whether the user panel has matching characteristics with the wireless access point, initiates a first wireless connection between the access point short range communication transceiver and the user panel short range communication transceiver, exchanges identification information, and registers the user panel to the intercom network.

19 Claims, 7 Drawing Sheets

(51) Int. Cl.
     *H04W 76/10*    (2018.01)
     *H04W 88/02*    (2009.01)

(56)            References Cited

U.S. PATENT DOCUMENTS 10,904,683  B2      1/2021   Riedel et al.
  11,050,576  B2      6/2021   Lee et al.
  11,228,889  B2      1/2022   Lee et al.
 2008/0279132 A1 *   11/2008   Noishiki ............... H04L 12/189
                                                              370/312
 2010/0189273 A1      7/2010   Statham et al.
 2012/0221695 A1      8/2012   Rose et al.
 2015/0245209 A1 *    8/2015   Jabara .................... H04L 67/02
                                                              705/14.39
 2016/0019526 A1 *    1/2016   Granbery ................. G01S 1/00
                                                              705/26.81
 2018/0198635 A1 *    7/2018   Lee ..................... H04L 12/1818
 2018/0288527 A1     10/2018   Riedel
 2022/0279260 A1      9/2022   Liebel et al.

OTHER PUBLICATIONS

International Search Report for Application No. PCT/EP2024/066967 dated Nov. 25, 2024 (7 pages).

* cited by examiner

WIRELESS REGISTRATION OF DEVICES WITH AND HANDLING OF PROFILES IN AN INTERCOM SYSTEM

BACKGROUND

Embodiments, examples, and aspects relate to, among other things, systems and methods for registering devices with a wireless access point.

SUMMARY

Intercom systems include a number of devices communicatively interconnected with one another over an intercom network. In many cases, an intercom system includes one or more central devices (for example, a controller) and a number of peripheral devices. Intercom systems are often used for real-time audio communication. For example, intercom systems are used at sports stadiums, concert halls, theaters, and other venues to allow, for example, television crews (or others) to communicate with one another. In some instances, the peripheral devices are wired devices. In other instances, the peripheral devices are wireless devices that register with an access point (or group of access points) and then communicate over the intercom network. The inventors have learned that in some instances, it is difficult to quickly and conveniently register wireless peripheral devices to access points, particularly when switching between different venues. In particular, the inventors have discovered that certain wireless data protocols are slower that others when used for registration of wireless peripheral devices.

Examples described herein provide, among other things, systems and methods for registering devices with a wireless access point.

One example provides an intercom system. The intercom system includes an intercom network and a user panel. The user panel includes a user panel wireless transceiver configured to establish wireless communications, a user panel short range communication transceiver configured to establish wireless communications, and a user panel electronic controller communicatively coupled to the user panel wireless transceiver and the user panel short range communication transceiver. The intercom system also includes a wireless access point communicatively coupled with the intercom network via a first intercom interface. The wireless access point includes an access point wireless transceiver configured to establish wireless communications, an access point short range communication transceiver configured to establish wireless communications, and an access point electronic controller communicatively coupled to the access point wireless transceiver and the access point short range communication transceiver. The access point electronic controller receives a user input, via the first intercom interface, to begin a registration mode, detects a first beacon signal via the access point short range communication transceiver from the user panel short range communication transceiver, and determines whether the user panel has matching characteristics with the wireless access point. The access point electronic controller also initiates a first wireless connection between the access point short range communication transceiver and the user panel short range communication transceiver in response to determining that the user panel has matching characteristics with the wireless access point, exchanges identification information between the access point short range communication transceiver and the user panel short range communication transceiver, and registers the user panel to the intercom network.

In some instances, the access point electronic controller disconnects the first wireless connection in response to registering the user panel to the intercom network.

In some instances, the user panel electronic controller transmits the first beacon signal via the user panel short range communication transceiver and initiates a second wireless connection between the user panel wireless transceiver and the access point wireless transceiver in response to registering the user panel.

In some instances, the user panel electronic controller receives a firmware update via a temporary wireless connection.

In some instances, the matching characteristics are at least one selected from the group consisting of a bandwidth, a connectivity strength, a signal sensitivity, and a universally unique identifier (UUID).

In some instances, the intercom system includes an external device communicatively coupled with the intercom network, the external device configured to receive the user input and transmit a signal indicative of the user input to the first intercom interface.

In some instances, the intercom system includes a mobile device communicatively coupled with the intercom network. The mobile device includes a mobile device short range communication transceiver and an audio interface. The mobile device configured to initiate a third wireless connection between mobile device short range communication transceiver and the user panel short range communication transceiver, transmit a control signal to the user panel via the third wireless communication, and exchange, via the user panel, control messages between the access point wireless transceiver and the user panel wireless transceiver based on the control signal.

In some instances, the mobile device communicates, via the audio interface, audio signals via the third wireless connection.

In some instances, the access point electronic controller determines a signal strength of the first beacon signal, and determines a distance from the wireless access point to the user panel based on the signal strength.

Another example provides a method for registering a user panel to an intercom system via a wireless access point. The user panel includes a user panel wireless transceiver, a user panel short range communication transceiver, and a user panel electronic controller. The wireless access point includes an access point wireless transceiver, an access point short range communication transceiver, and an access point electronic controller. The method includes receiving a user input, via the access point electronic controller, to begin a registration mode, detecting, via the access point electronic controller, a first beacon signal at the access point short range communication transceiver from the user panel short range communication transceiver and determining, via the access point electronic controller, whether the user panel has matching characteristics with the wireless access point. The method also includes initiating, via the access point electronic controller, a first wireless connection between the access point short range communication transceiver and the user panel short range communication transceiver in response to determining that the user panel has matching characteristics with the wireless access point exchanging, via the access point electronic controller, identification information between the access point short range communication transceiver and the user panel short range communication transceiver, and registering, via the access point electronic controller, the user panel to an intercom network.

In some instances, the method includes disconnecting, via the access point electronic controller, the first wireless connection in response to registering the user panel to the intercom network.

In some instances, the method includes transmitting, via the user panel electronic controller, the first beacon signal via the user panel short range communication transceiver and initiating, via the user panel electronic controller, a second wireless connection between the user panel wireless transceiver and the access point wireless transceiver in response to registering the user panel.

In some instances, the method includes receiving, via the user panel electronic controller, a firmware update from a temporary wireless connection.

In some instances, the method includes initiating, via a mobile device, a third wireless connection between a mobile device short range communication transceiver and the user panel short range communication transceiver, transmitting, via the mobile device, a control signal to the user panel via the third wireless communication, and exchanging, via the user panel, control messages between the access point wireless transceiver and the user panel wireless transceiver based on the control signal.

In some instances, the method includes communicating, via an audio interface of the mobile device, audio signals via the third wireless connection.

In some instances, the method includes determining, via the access point electronic controller, a signal strength of the first beacon signal and determining, via the access point electronic controller, a distance from the wireless access point to the user panel based on the signal strength.

Another example provides a method for logging into a user panel of an intercom system via a mobile device. The method includes receiving, via the mobile device, a user input to create a new user, transmitting, via the user panel, a first beacon signal from a user panel short range communication transceiver, and receiving, via the mobile device, the first beacon signal at a mobile device short range communication transceiver. The method also includes initiating, via the mobile device, a first wireless connection between the user panel short range communication transceiver and the mobile device short range communication transceiver, transmitting, via the mobile device, identification information over the first wireless connection, and disconnecting, via the mobile device, the first wireless connection in response to exchanging the identification information.

In some instances, the method includes retrieving, via the user panel, personalization settings of the new user from the intercom network.

In some instances, the personalization settings include at least one selected from the group consisting of key assignments, volume, microphone gain, and brightness.

Other features, aspects, and benefits of various examples will become apparent by consideration of the detailed description and accompanying drawings.

DETAILED DESCRIPTION

One or more examples are described and illustrated in the following description and accompanying drawings. These examples are not limited to the specific details provided herein and may be modified in various ways. Other examples may exist that are not described herein. For example, a device or structure that is "configured" in a certain way is configured in at least that way but may also be configured in ways that are not listed.

It should also be noted that a plurality of hardware and software based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the aspects may be implemented in software (for example, stored on non-transitory computer-readable medium) executable by one or more processors. Thus, a plurality of hardware and software based devices, as well as a plurality of different structural components may be utilized to implement various aspects and examples. For example, "control units" and "controllers" described in the specification can include one or more electronic processors, one or more memory modules including a non-transitory computer-readable medium, one or more input/output interfaces, and various connections (for example, a system bus) connecting the components. It should be understood that although certain drawings illustrate hardware and software located within particular devices, these depictions are for illustrative purposes only. Unless the context clearly indicates otherwise, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Examples described herein may be implemented via a non-transitory, computer-readable medium storing instructions executable by one or more electronic processors to perform the described functionality. As used in the present application, "non-transitory computer-readable medium" comprises all computer-readable media but does not include a transitory, propagating signal. Accordingly, non-transitory computer-readable medium may include, for example, a hard disk, a CD-ROM, an optical storage device, a magnetic storage device, ROM (Read Only Memory), RAM (Random Access Memory), register memory, a processor cache, other memory and storage devices, or combinations thereof.

Figure 1:
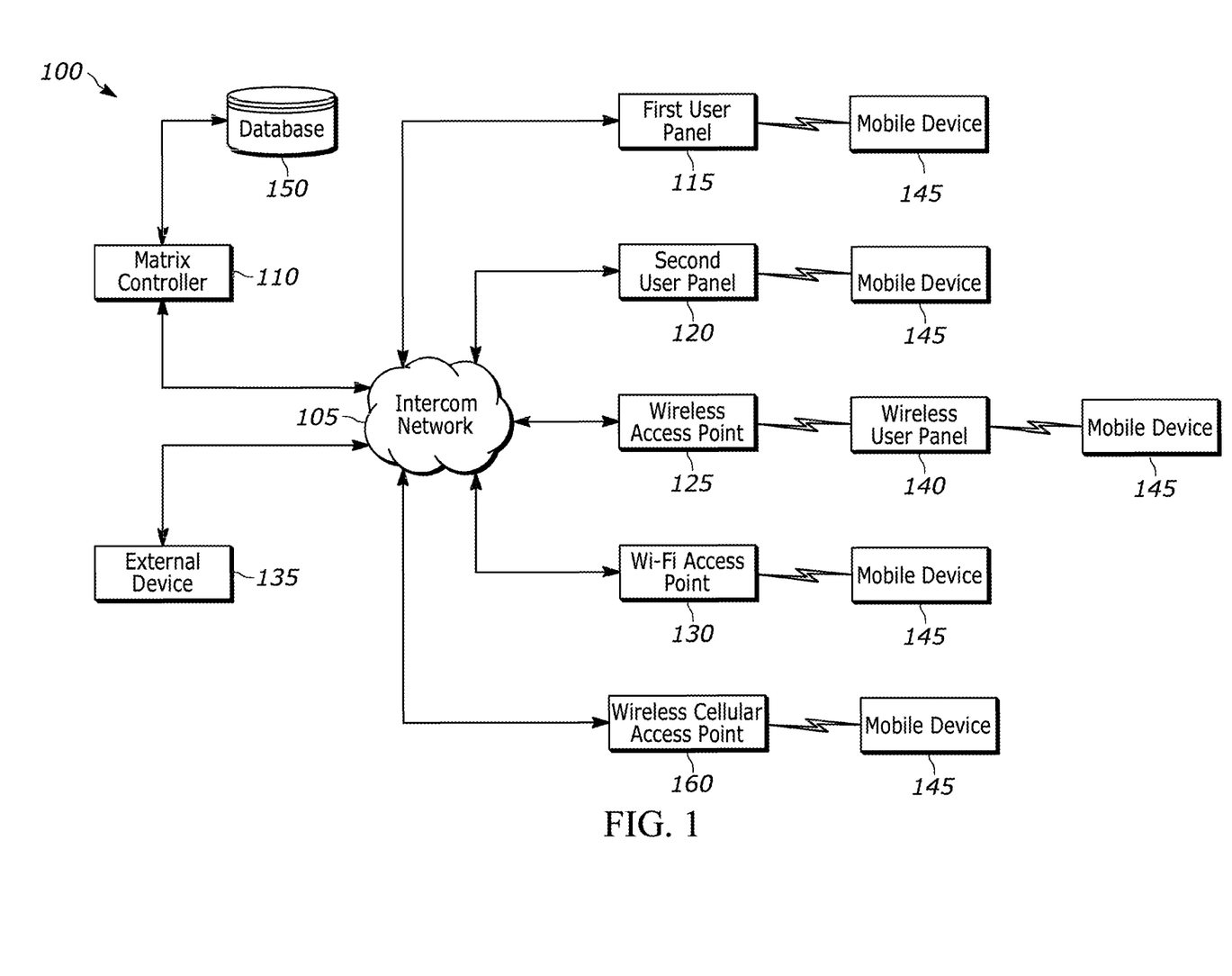
FIG. 1 is a block diagram of an intercom system, according to some examples.

FIG. 1 is a block diagram of an intercom system 100. In the example illustrated, the intercom system 100 includes an intercom network 105, a matrix controller 110, a first user panel 115 (e.g., a rackmount user panel), a second user panel 120 (e.g., a desktop user panel), a wireless access point 125, a Wi-Fi access point 130, and an external device 135. The intercom system 100 also includes a wireless user panel 140 (e.g., a beltpack), a mobile device 145, a database 150, and a wireless cellular access point 160. The intercom system 100 includes a plurality of peripheral devices (e.g., the wireless user panel 140 and the mobile device 145) in electronic communication with a controller (e.g., the matrix controller 110) to allow for real-time audio communication. To establish electronic communication between the plurality of peripheral devices and the controller, some peripheral devices (e.g., the wireless peripherals) of the plurality of peripheral devices gain access to the intercom network 105 by registering with a registering device (e.g., the wireless access point 125, the Wi-Fi access point 130, or the wireless cellular access point 160). In some examples, the plurality of peripheral devices are devices that transmit beacon signals for detection (e.g., discovery) by the registering device. The registering device detects the beacon signals from the plurality of peripheral devices and initiates an outgoing connection request. Each peripheral device of the plurality of peripheral devices may accept the outgoing connection request to establish electronic communication with the registering device and participate in a registration process (further described below in reference to FIGS. 3-6).

The intercom system 100 may be utilized in sports stadiums, concert halls, theaters, and other venues. Users may be part of a team controlling video and audio broadcasts of the venue. In some instances, the venue includes a mobile broadcast facility with an Ethernet infrastructure. The devices (e.g., the matrix controller 110, the first user panel 115, the second user panel 120, the wireless access point 125, the Wi-Fi access point 130, the external device 135, the wireless user panel 140, the mobile device 145, and the wireless cellular access point 160) of the intercom system 100 communicate with each other over the intercom network 105.

In some examples, the intercom network 105 includes a combination of networks or communication links. Some devices may communicate with each other using wired protocols and communication links, for example, Ethernet. Other devices communicate with each other using wireless protocols and communication links. In one instance, the wireless user panel 140 communicates via a digital enhanced cordless telecommunications (DECT) connection, while the mobile device 145 communicates via a Wi-Fi connection. In other instances, the mobile device 145 communicates with the wireless cellular access point 160 via a 5G, long term evolution (LTE), or other suitable wireless connection. In the example shown, the matrix controller 110, the first user panel 115, the second user panel 120, the wireless access point 125, the Wi-Fi access point 130, the external device 135, and the wireless cellular access point 160 are connected to the intercom network 105 via Ethernet connections.

In one example, the matrix controller 110 (e.g., an electronic controller) is the controller of the intercom system 100. In some instances, functions of the matrix controller 110 are performed within a device often referred to as a matrix. The matrix controller 110 communicates with the peripheral devices via the intercom network 105. In some examples, the matrix controller 110 mixes and distributes audio (or, more specifically, audio signals) to the devices of the intercom system 100. The wireless user panel 140 may gain access to the intercom network 105 by registering with the wireless access point 125. In one example, the wireless user panel 140 is assigned to the matrix controller 110. When the wireless user panel 140 is assigned to the matrix controller 110, the matrix controller 110 stores in memory (further described below in reference to FIG. 2) personalization settings for a user of the wireless user panel 140. Personalization settings include, for example, key assignments, volume, microphone gain, brightness, and other user-configurable settings of the wireless user panel 140. The matrix controller 110 is communicatively connected to the database 150. In some examples, the database 150 includes a memory that stores the personalization settings and other data associated with the wireless user panel 140. In some examples, the matrix controller 110 includes a display and a user interface configured to receive user inputs. In other examples, the functions of the matrix controller 110 are performed via the peripheral devices, such as the wireless access point 125 or the wireless user panel 140, without a dedicated hardware device.

In some examples, the first user panel 115 includes a display and a user interface configured to receive user inputs. The first user panel 115 may receive a user input indicative of directing audio to the matrix controller 110. In response to receiving such a user input, the first user panel 115 transmits an audio command to the matrix controller 110. The matrix controller 110 receives the audio command and determines how to mix and route the audio and/or communications based on the audio command.

Similar to the first user panel 115, the second user panel 120 is communicatively connected to the intercom network 105. In some instances, the second user panel 120 is a desktop user panel located within the venue. It should be understood that the second user panel 120 may include similar components and perform similar functions to the first user panel 115.

The wireless access point 125 is positioned within the venue at a fixed location (e.g., on the ceiling of the venue, on a wall of the venue, etc.). The wireless access point 125 is a device that allows wireless devices to connect to a wired or other network. In the example shown, the wireless access point 125 connects the peripheral devices (e.g., the wireless user panel 140) to the intercom network 105. The wireless access point 125 also transmits beacon signals (e.g., a DECT beacon signal) within a wireless signal transmission range. The wireless access point 125 receives beacon signals (e.g., a Bluetooth low energy (BLE) beacon signal) within a wireless signal reception range of the wireless access point 125. In some examples, the wireless access point 125 scans for beacon signals and receives a BLE beacon signal from the wireless user panel 140. The wireless user panel 140 transmits the BLE beacon signal within the wireless signal reception range of the wireless access point 125. When the BLE beacon signal is received by the wireless access point 125, the wireless access point 125 verifies information received via the BLE beacon signal. When the information is verified, the wireless access point 125 initiates a wireless connection with the wireless user panel 140. In other examples, the wireless access point 125 transmits the BLE beacon signal. In such examples, the wireless user panel 140 receives the BLE beacon signal and initiates the wireless connection. As described in further detail below with reference to FIGS. 3 and 4, the wireless connection is preferably a Bluetooth Low Energy (BLE) connection.

It should be understood that the intercom system 100 may include more than one wireless access point 125. In such instances, the wireless signal reception range of each wireless access point 125 may overlap such that a wireless connection between the wireless user panel 140 and subsequent wireless access points 125 is initiated as the wireless user panel 140 is moved out of the wireless signal reception range of the wireless access point 125 and into the wireless signal reception range of the subsequent wireless access point 125. Similar to the wireless access point 125, the Wi-Fi access point 130 is positioned within the venue at a fixed location. The Wi-Fi access point 130 connects the peripheral devices (e.g., the mobile device 145) to the intercom network 105. The Wi-Fi access point 130 detects radio signals from the mobile device 145 within a wireless signal reception range of the Wi-Fi access point 130. The Wi-Fi access point 130 also transmits radio signals within a wireless signal transmission range of the Wi-Fi access point 130.

In some examples, the wireless user panel 140 is a beltpack device designed to be carried on a user's belt. As described above, the wireless user panel 140 may register with the wireless access point 125 to gain access to the intercom network 105. In some examples, the wireless user panel 140 includes a display and a user interface configured to receive user inputs. In some instances, the user interface includes a plurality of push buttons. Each push button of the plurality of push buttons corresponds to an audio channel between another wireless user panel 140, the first user panel 115, the second user panel 120, or the mobile device 145. In some examples, a push button of the plurality of push buttons corresponds to an audio channel between a group of devices (e.g., multiple wireless user panels 140, first user panels 115, second user panels 120, or mobile devices 145), often referred to as a party line. The wireless user panel 140 allows for push to talk communication via the intercom network 105. Additionally, each push button of the plurality of push buttons allows the user to manage multiple communication channels via the wireless user panel 140.

In some examples, the mobile device 145, for example, a smartphone, tablet, or the like, operates as a mobile virtual user panel. In some instances, the mobile device 145 executes a virtual user panel application (VUPA) (e.g., VLink) stored in a memory of the mobile device 145. When executing the VUPA, the mobile device 145 transfers audio and data with the matrix controller 110 via the Wi-Fi access point 130. In such instances, the mobile device 145 acts as the wireless user panel 140. Additionally or alternatively, the mobile device 145 may include software or an application to emulate the first user panel 115 or the second user panel 120. When emulating the first user panel 115 or the second user panel 120, the mobile device 145 allows the user to remotely direct communication between other user panels. In other examples, the mobile device 145 provides a login interface through which a user may login to the first user panel 115, the second user panel 120, and the wireless user panel 140 and access the personalization settings of the user. In some examples, the external device 135 is a smartphone, personal computer, tablet, or the like including software for analyzing signal information from the wireless access point 125 and registering the wireless user panel 140 to the intercom network 105. In some examples, the external device 135 includes a display and a user interface configured to receive user inputs.

Figure 2:
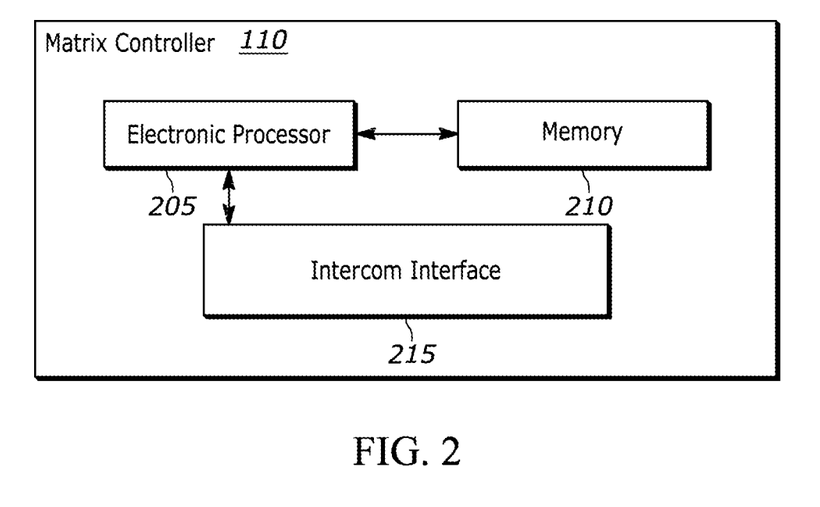
FIG. 2 is a block diagram of a matrix controller of the intercom system of FIG. 1, according to some examples.

FIG. 2 is a block diagram of the matrix controller 110 of the intercom system 100 of FIG. 1. The matrix controller 110 includes, among other things, an electronic processor 205 (such as a programmable electronic microprocessor, microcontroller, or similar device), a memory 210 (for example, a non-transitory, machine readable medium), and an intercom interface 215. The electronic processor 205 is electronically connected to the memory 210 and the intercom interface 215. The electronic processor 205 sends and receives information (for example, from the memory 210 and/or the intercom interface 215) and processes the information by executing one or more software instructions or modules, capable of being stored in the memory 210, or another non-transitory computer readable medium. The software can include firmware, one or more applications, program data, filters, rules, one or more program modules, and other executable instructions. The electronic processor 205 is configured to retrieve from the memory 210 and execute, among other things, software for performing methods as described herein. The intercom interface 215 transmits and receives information from devices external to the electronic processor 205 (for example, components of the intercom system 100 via the intercom network 105).

Figure 3:
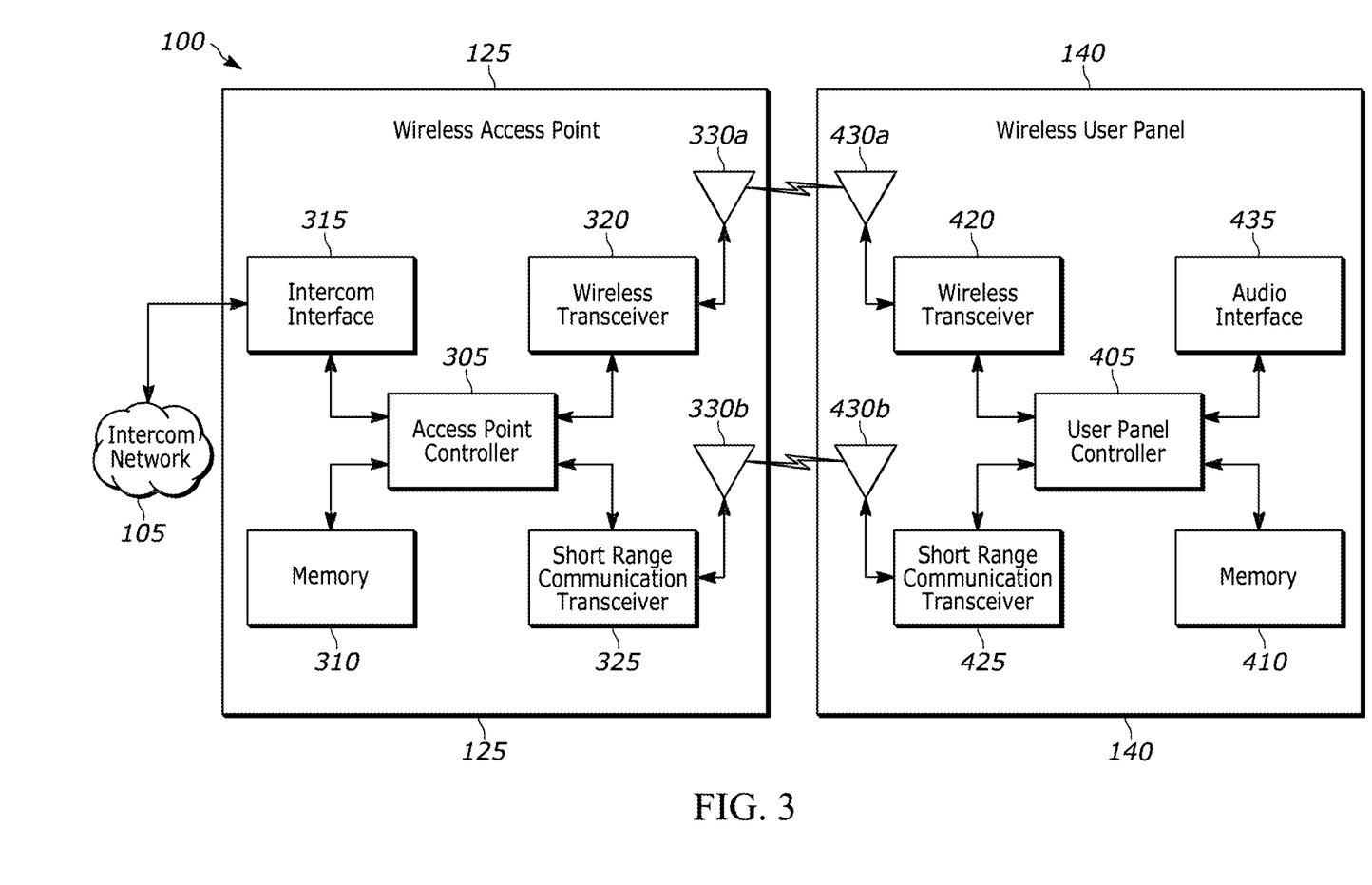
FIG. 3 is a block diagram of a wireless access point and a wireless user panel of the intercom system of FIG. 1, according to some examples.

FIG. 3 is a block diagram of the wireless access point 125 and the wireless user panel 140 of the intercom system 100 of FIG. 1. In the example shown, the wireless access point 125 includes, among other things, a first electronic controller 305 (e.g., an access point controller), an access point memory 310, an intercom interface 315, a first wireless transceiver 320 (e.g., an access point wireless transceiver), a first short range communication transceiver 325 (e.g., an access point short range communication transceiver), a first antenna 330a, and a second antenna 330b. It should be understood that the first electronic controller 305, the access point memory 310, and the intercom interface 315 include similar components to those described above with respect to the electronic processor 205, the memory 210, and the intercom interface 215, respectively, and, in some instances perform similar functions. The first electronic controller 305 is communicatively connected to the access point memory 310, the intercom interface 315, the first short range communication transceiver 325.

The first wireless transceiver 320 is communicatively connected to the first antenna 330a. In some examples, the first wireless transceiver 320 is configured to transmit and receive information over a wireless connection (e.g., a DECT connection) with other wireless user panels 140 via the first antenna 330a. For example, the wireless access point 125 transmits information via the first antenna 330a in response to a command from the first electronic controller 305 within the range of the wireless access point 125. The first short range wireless communication transceiver 325 is communicatively connected to the second antenna 330b. In some examples, the first short range wireless communication transceiver 325 is a BLE transceiver or other suitable Bluetooth™ transceiver. The first short range wireless communication transceiver 325 is configured to transmit and receive information over a wireless connection (e.g., a BLE connection) with other short range wireless communication transceivers via the second antenna 330b.

In the example shown, the wireless user panel 140 includes, among other things, a second electronic controller 405 (e.g., a user panel controller), a user panel memory 410, an audio interface 435, a second wireless transceiver 420 (e.g., a user panel wireless transceiver), a second short range communication transceiver 425 (e.g., a user panel short range communication transceiver), a third antenna 430a, and a fourth antenna 430b. It should be understood that the second electronic controller 405 and the user panel memory 410 include similar components to those described above with respect to the first electronic controller 305 and the access point memory 310, respectively, and perform similar functions but need not be identical. The second electronic controller 405 is communicatively connected to the user panel memory 410, the audio interface 435, the second wireless transceiver 420, and the second short range communication transceiver 425.

The audio interface 435 transmits and receives audio distributed by the matrix controller 110 when the wireless user panel 140 is connected to the intercom network 105. For example, the audio interface 435 includes a microphone that captures audio of the environment surrounding the wireless user panel 140. Also, in some examples, the audio interface 435 includes a speaker that provides audio distributed from the matrix controller 110. The audio interface 435 allows for communication between the user and other devices of the intercom network 105. In some examples, the second wireless transceiver 420 is communicatively connected to the third antenna 430a. The second wireless transceiver 420 may include similar components to and perform similar functions as the first wireless transceiver 320. For example, the second wireless transceiver 420 detects a beacon signal from the first wireless transceiver 320 via the third antenna 430a. The second wireless transceiver 420 verifies information received via the beacon signal and establishes a DECT wireless connection when the wireless user panel 140 is registered.

The second short range communication transceiver 425 is communicatively connected to the fourth antenna 430b. In some examples, the second short range communication transceiver 425 includes similar components to and performs similar functions as the first short range communication transceiver 325. For example, the second short range communication transceiver 425 is a BLE transceiver or other suitable Bluetooth™ transceiver. In some examples, the second short range communication transceiver 425 wirelessly connects (e.g., via a BLE connection) to the first short range communication transceiver 325 via the fourth antenna 430b and the second antenna 330b, respectively. Also, the second short range communication transceiver 425 may transmit information to the wireless access point 125 via the fourth antenna 430b.

Figure 4:
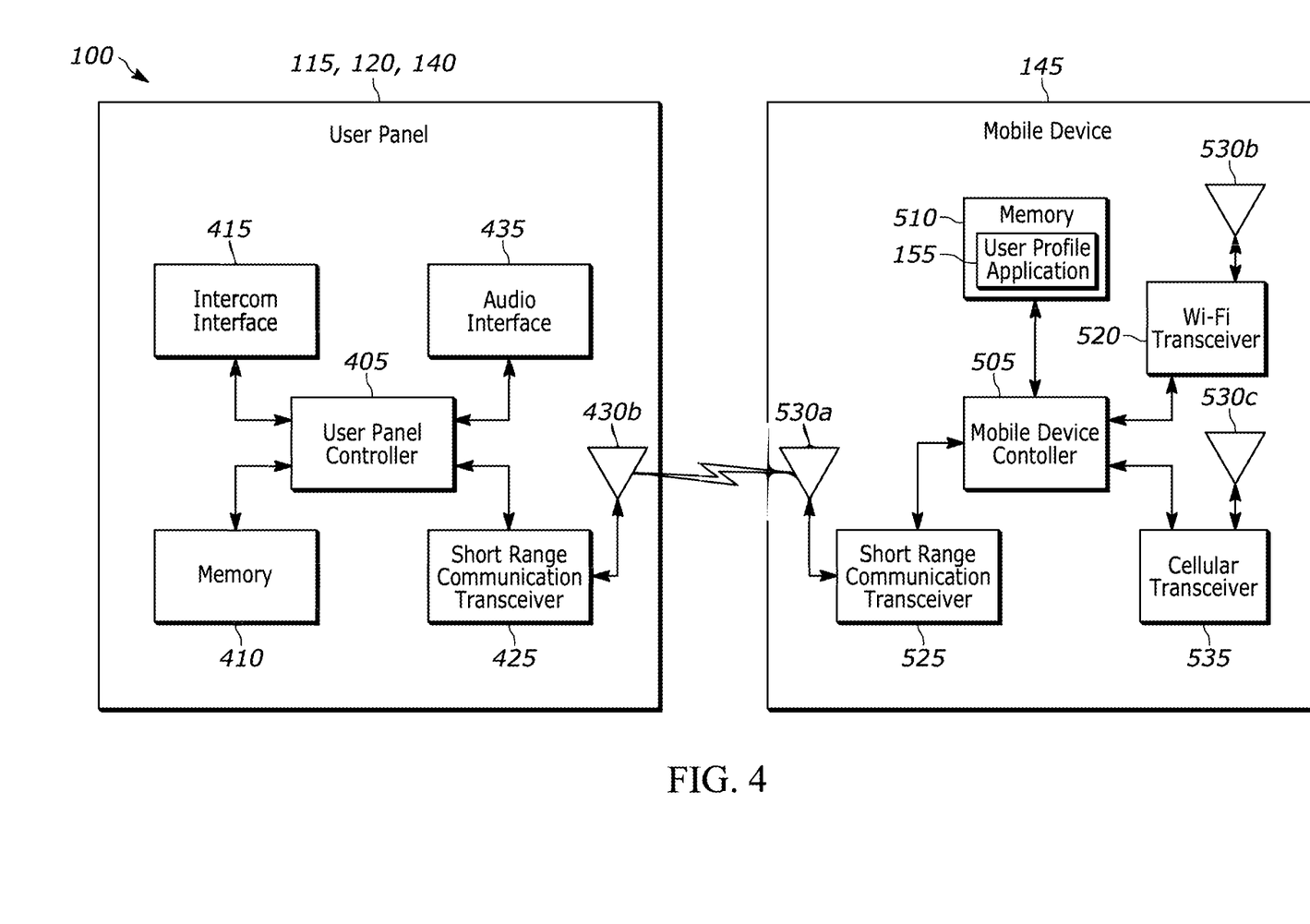
FIG. 4 is a block diagram of a user panel and a mobile device of the intercom system of FIG. 1, according to some examples.

FIG. 4 is a block diagram of a user panel (e.g., the first user panel 115, the second user panel 120, or the wireless user panel 140) and the mobile device 145 of the mobile device system 100 of FIG. 1. In the example shown, the user panel 115, 120, 140 includes the same or similar components to the first user panel 115, the second user panel 120, and the wireless user panel 140 described above with reference to FIGS. 1 and 3. The user panel 115, 120, 140 also includes an intercom interface 415. The intercom interface 415 is communicatively connected to the second electronic controller 405. In some examples, the intercom interface 415 transmits and receives information from devices external to the second electronic controller 405 (for example, components of the intercom system 100 via the intercom network 105). For the first user panel 115 and the second user panel 120, the intercom interface 415 is a wired interface (e.g., making connections via an Ethernet connection). For the wireless user panel 140, the intercom interface 415 is a wireless interface (e.g., a making a DECT connection via the second wireless transceiver 420) to the wireless access point 125. The wireless access point 125 relays communication between the intercom network 105 and the intercom interface 415 via the wireless connection.

In the example shown, the mobile device 145 includes, among other things, a third electronic controller 505 (e.g., a mobile device controller), a mobile device memory 510, a Wi-Fi transceiver 520, a third short range communication transceiver 525 (e.g., a mobile device short range communication transceiver), a fifth antenna 530a, and a sixth antenna 530b. The mobile device 145 also includes a cellular transceiver 535, a seventh antenna 530c, and a user profile application 155 stored within the mobile device memory 510. It should be understood that the third electronic controller 505 and the mobile device memory 510 include similar components to those described above with respect to the first electronic controller 305 and the access point memory 310, respectively, and perform similar functions but need not be identical. The third electronic controller 505 is communicatively connected to the mobile device memory 510, the Wi-Fi transceiver 520, the third short range communication transceiver 525, and the cellular transceiver 535. In some examples, the user profile application 155 is configured to set up the personalization settings of the wireless user panel 140. In some instances, the user profile application 155 communicates with the database 150 via the mobile device 145. The database 150 stores the personalization settings and supports new users from the user profile application 155.

In some examples, the Wi-Fi transceiver 520 is communicatively connected to the sixth antenna 530b. In some instances, such as the example shown in FIG. 1, the mobile device 145 is connected to the Wi-Fi access point 130 via the Wi-Fi transceiver 520. For example, the Wi-Fi transceiver 520 wirelessly connects with the Wi-Fi access point 130 via the sixth antenna 530b. The mobile device 145 executes the VUPA to communicate over the intercom network 105 via the Wi-Fi access point 130. The third short range communication transceiver 525 is communicatively connected to the fifth antenna 530a. In some examples, the third short range communication transceiver 525 includes similar components to and performs similar functions as the first short range communication transceiver 325. For example, the third short range communication transceiver 525 is a BLE transceiver or other suitable Bluetooth™ transceiver. In some examples, the third short range communication transceiver 525 wirelessly connects (e.g., via a BLE connection) to the second short range communication transceiver 425 via the fifth antenna 530a and the fourth antenna 430b, respectively. Also, the third short range communication transceiver 525 may transmit information to the wireless user panel 140 via the fifth antenna 530a. In some examples, the cellular transceiver 535 is communicatively connected to the seventh antenna 530c. In some instances, such as the example shown in FIG. 1, the mobile device 145 is connected to the wireless cellular access point 160 via the cellular transceiver 535. For example, the cellular transceiver 535 wirelessly connects to the wireless cellular access point 160 via the seventh antenna 530c. The mobile device 145 executes the VUPA to communicate to communicate over the intercom network 105 via the wireless cellular access point 160.

Figure 5:
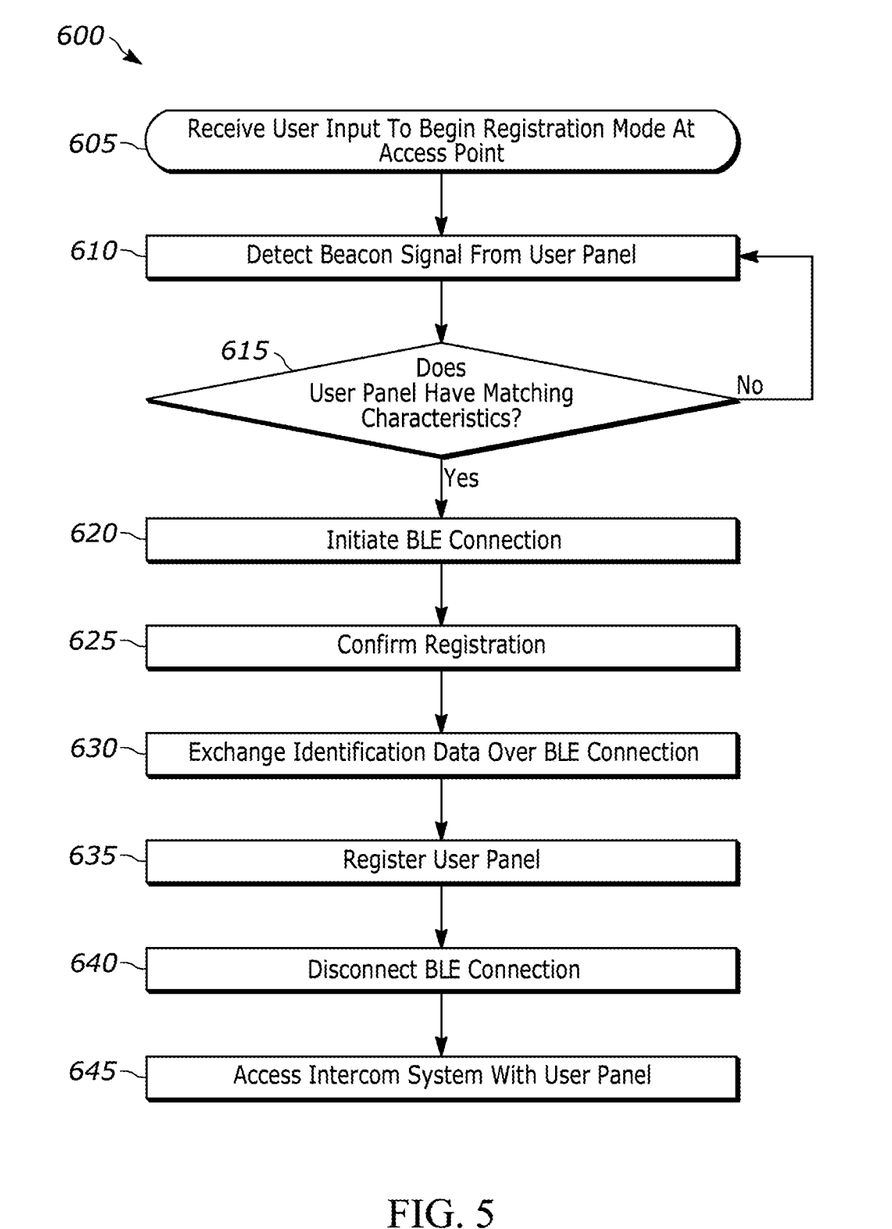
FIG. 5 illustrates a flow chart of a method for registering a wireless user panel to an intercom system, according to some examples.

FIG. 5 illustrates a flow chart of an example method 600 for registering the wireless user panel 140 to the wireless access point 125 and gaining access to the intercom network 105. The method 600 is described as being executed by the access point electronic controller 305. However, in some examples, aspects of the method 600 are performed by another device. For example, aspects of the method 600 may be performed by the user panel electronic controller 405 in conjunction with the access point electronic controller 305. Additionally, while a particular order is provided, in some examples, the steps of the method 600 may be performed in a different order.

At step 605, the access point electronic controller 305 receives a user input to begin a registration mode. The access point electronic controller 305 may receive the user input from a device connected to the intercom network 105 via the intercom interface 315. For example, the external device 135 receives the user input indicative of beginning the registration mode via software stored in a memory of the external device 135. In response, the external device 135 transmits a signal indicative of the user input to the access point electronic controller 305 over the intercom network 105. When the registration mode begins, the intercom system 100 allows devices to register to the intercom network 105 via the wireless access point 125. The registration mode lasts for a period. The period may be a predetermined amount of time or a user-selected amount of time based on intercom system 100. When the access point electronic controller 305 begins the registration mode, the method 600 proceeds to step 610.

At step 610, the access point electronic controller 305 detects a first beacon signal (e.g., a first BLE beacon signal) from the user panel short range communication transceiver 425 via the access point short range communication transceiver 325. For example, the wireless access point 125 scans the venue within the wireless signal reception range for peripheral devices to register with the intercom network 105. The user panel electronic controller 405 transmits the first beacon signal from the user panel short range communication transceiver 425 via the fourth antenna 430b. The access point electronic controller 305 detects the first beacon signal received via the second antenna 330b. The method 600 then proceeds to step 615.

At step 615, the access point electronic controller 305 determines whether the wireless user panel 140 has matching characteristics with the wireless access point 125 such that the wireless user panel 140 is configured to wirelessly connect to the wireless access point 125. For example, the matching characteristics include a bandwidth, a connectivity strength, a signal sensitivity, or a universally unique identifier (UUID). When the access point electronic controller 305 determines that the wireless access point 125 does not have matching characteristics with the wireless user panel 140, the method 600 returns to step 610 to continue scanning the venue for peripheral devices to register to the intercom network 105. When the access point electronic controller 305 determines that the wireless access point 125 has matching characteristics with the wireless user panel 140, the method 600 proceeds to step 620.

At step 620, the access point electronic controller 305 automatically initiates a first wireless connection between the access point short range communication transceiver 325 and the user panel short range communication transceiver 425 via the second antenna 330b and the fourth antenna 430b, respectively. The first wireless connection is automatically initiated in response to the access point electronic controller 305 determining that the wireless access point 125 and the wireless user panel 140 have matching characteristics. In one example, the first wireless connection is preferably a BLE connection. In some instances, the wireless signal transmission range and the wireless signal reception range for the BLE connection is between 10 meters and 100 meters. The wireless access point 125 and the wireless user panel 140 transmit information over a bandwidth of 2.4 gigahertz (GHz) to 2.48 GHz. The first wireless connection allows for fast and convenient registration for the wireless user panel 140. The method 600 then proceeds to step 625 or step 630.

In some instances, the method 600 optionally proceeds to step 625. At step 625, the access point electronic controller 305 confirms the registration of the wireless user panel 140 to the intercom network 105. For example, the access point electronic controller 305 transmits a confirmation signal over the first wireless connection to confirm a new registration to the intercom network 105. A user of the wireless user panel 140 may confirm the new registration via a user input in response to the confirmation signal. The registration confirmation prevents unwanted registrations to the intercom network 105. The method 600 then proceeds to step 630.

At step 630, the access point electronic controller 305 exchanges identification information with the user panel electronic controller 405 to complete registration of the wireless user panel 140. For example, the user panel electronic controller 405 exchanges the identification information over the first wireless connection. The identification information may include a UUID or DECT identities associated with a DECT Standard Association Algorithm (e.g., DSAA, DSAA2, etc.) of the wireless user panel 140. The method 600 then proceeds to step 635. At step 635, the access point electronic controller 305 registers the wireless user panel 140 to the intercom network 105 via the wireless access point 125. The access point electronic controller 305 stores the identification information to a registration record within the access point memory 310. The registration record may be shared over the intercom network 105 to register the wireless user panel 140. Also, the user panel electronic controller 405 stores the identification information to a registration record within the user panel memory 410. The method 600 then proceeds to step 640.

At step 640, the access point electronic controller 305 disconnects the first wireless connection in response to registering the wireless user panel 140. The method 600 then proceeds to step 645. At step 645, the wireless user panel 140 accesses the intercom network 105. The user panel electronic controller 405 initiates a second wireless connection between the second wireless transceiver 420 and the intercom network 105 via the first wireless transceiver 320 of the wireless access point 125. In one example, the second wireless connection is preferably a DECT wireless connection such that the wireless user panel 140 communicates with components of the intercom system 100 via the wireless access point 125 using DECT protocol.

In some examples, when the wireless user panel 140 accesses the intercom network 105, the mobile device 145 initiates a third wireless connection between the mobile device short range communication transceiver 525 and the user panel short range communication transceiver 425, via the fourth antenna 430b and the fifth antenna 530a respectively. In one example, the third wireless connection is preferably a BLE connection. The mobile device 145 may transmit a control signal via the third wireless connection. In some examples, when the wireless user panel 140 receives the control signal, the wireless user panel 140 exchanges control messages between the second wireless transceiver 420 and the first wireless transceiver 320 based on the control signal. In some instances, a user interacts remotely with the user panel 115, 120, 140 via the mobile device 145 over the third wireless connection. The user may remotely login to the user panel 115, 120, 140 and transfer personalization settings of the user over the third wireless connection via the mobile device 145. In some examples, the mobile device 145 includes an audio interface. The mobile device 145 may communicate audio signals received from the third wireless connection via the audio interface.

Figure 6:
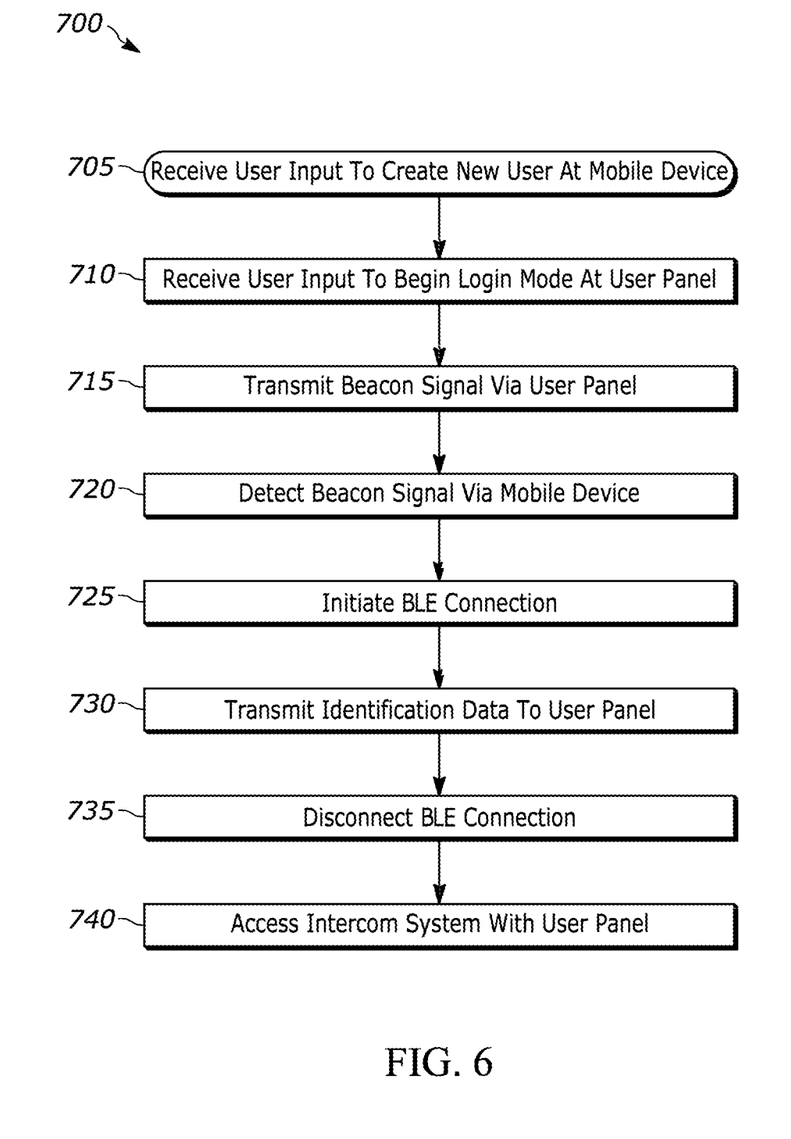
FIG. 6 illustrates a flow chart of a method for logging into a user panel of an intercom system via a mobile device, according to some examples.

FIG. 6 illustrates a flow chart of an example method 700 for logging into the wireless user panel 140 of the intercom system 100 via the mobile device 145. The method 700 is described herein with reference to the wireless user panel 140. However, in some examples, aspects of the method 700 may be performed to login to the first user panel 115 and the second user panel 120 via the mobile device 145. The method 700 is described as being executed by the mobile device 145. However, in some examples, aspects of the method 700 are performed by another device. For example, aspects of the method 700 may be performed by the user panel electronic controller 405 in conjunction with the mobile device 145. Additionally, while a particular order is provided, in some examples, the steps of the method 700 may be performed in a different order.

At step 705, the mobile device 145 receives a user input to create a new user. For example, the mobile device 145 executes the user profile application 155 and receives the user input to create the new user of the wireless user panel 140. In some examples, a UUID is generated and stored for the new user. The method 700 then proceeds to step 710.

At step 710, the user panel electronic controller 405 receives a user input to begin a login mode. The user panel electronic controller 405 may receive the user input indicative of beginning the login mode from the user interface of the wireless user panel 140. When the login mode begins, the user panel electronic controller 405 allows login into the wireless user panel 140. The login mode lasts for a period. The period may be a predetermined amount of time or a user-selected amount of time based on the wireless user panel 140. When the user panel electronic controller 405 begins the login mode, the method 700 proceeds to step 715. At step 715, the wireless user panel 140 transmits a first beacon signal (e.g., a first BLE beacon signal) from the user panel short range communication transceiver 425. For example, the wireless user panel 140 transmits the first beacon signal via the fourth antenna 430b within a wireless signal transmission range of the wireless user panel 140. The method 700 then proceeds to step 720.

At step 720, the mobile device 145 detects the first beacon signal at the mobile device short range communication transceiver 525. For example, the mobile device short range communication transceiver 525 detects the first beacon signal via the fifth antenna 530a. The method 700 then proceeds to step 725. At step 725, in response to detecting the first beacon signal, the mobile device 145 verifies information received via the first beacon signal. When the information is verified, the mobile device 145 automatically initiates a first wireless connection between the user panel short range communication transceiver 425 and the mobile device short range communication transceiver 525, via the fourth antenna 430b and the fifth antenna 530a, respectively. Similar to the first wireless connection described above with respect to the method 600, the first wireless connection of the method 700 is preferably a BLE connection. The method 700 then proceeds to step 730.

At step 730, the mobile device 145 transmits identification information, for example the UUID of the new user, over the first wireless connection. For example, the mobile device 145 transmits the UUID over the first wireless connection and the user panel electronic controller 405 stores the UUID in the user panel memory 410. When the UUID is stored in the user panel memory 410, the user is logged in to the wireless user panel 140. In some examples, the wireless user panel 140 is registered to the intercom network 105 when the identification information is transmitted over the first wireless connection. The method 700 then proceeds to step 735. At step 735, the mobile device 145 disconnects the first wireless connection in response to transmitting the identification information. The method 700 then proceeds to step 740.

At step 740, the wireless user panel 140 accesses the intercom network 105. The user panel electronic controller 405 initiates a second wireless connection between the second wireless transceiver 420 and the intercom network 105 via the first wireless transceiver 320 of the wireless access point 125 in response to login completion. The wireless user panel 140 may retrieve (e.g., download) the personalization settings associated with the new user from the database 150. In one example, the second wireless connection is preferably a DECT wireless connection such that the wireless user panel 140 communicates with components of the intercom system 100 via the wireless access point 125 using DECT protocol.

In some examples, the user panel electronic controller 405 receives firmware updates via a temporary wireless connection between the wireless user panel 140 and the wireless access point 125. In one example, the temporary wireless connection is preferably a BLE connection. The external device 135 includes firmware or configuration data stored in an external device memory. The external device 135 transfers the firmware update or configuration data to the wireless access point 125 over the intercom network 105. The wireless access point 125 transfers the firmware update or configuration data via the access point short range communication transceiver 325 to the user panel short range communication transceiver 425 over the temporary wireless connection. Once the firmware update is complete, the access point electronic controller 305 disconnects the temporary wireless connection. The temporary wireless connection may allow for a faster update process.

In other examples, the wireless access point 125 of the intercom system 100 determines a location of the wireless user panel 140. The access point electronic controller 305 determines a signal strength of the first beacon signal of the method 600. For example, the access point electronic controller 305 detects a received signal strength indicator (RSSI) associated with the first beacon signal. Based on the determined signal strength, the access point electronic controller 305 determines a distance from the wireless access point 125 to the wireless user panel 140. The wireless access point 125 may transmit a signal indicative of the distance to other wireless access points 125 and components of the intercom system 100. In some examples, the access point electronic controller 305 determines a proximity (e.g., close, intermediate, or far) of the wireless user panel 140. The proximity of the wireless user panel 140 may be determined based on RSSI detected from the wireless access point 125 and subsequent wireless access points 125. A signal indicative of the relative proximity and/or distance may be transmitted over the intercom network 105 (e.g., via Ethernet connection) and displayed via a display within the intercom system 100 (for example, the display of the external device 135). In other examples, the external device 135 receives a user input via the user interface indicative of selecting the located wireless user panel. The external device 135 transmits a command to the selected wireless user panel to flash the wireless user panel display, vibrate the selected wireless user panel, and/or provide an audible alarm via the audio interface 435 such that the user identifies the selected wireless user panel.

Figure 7:
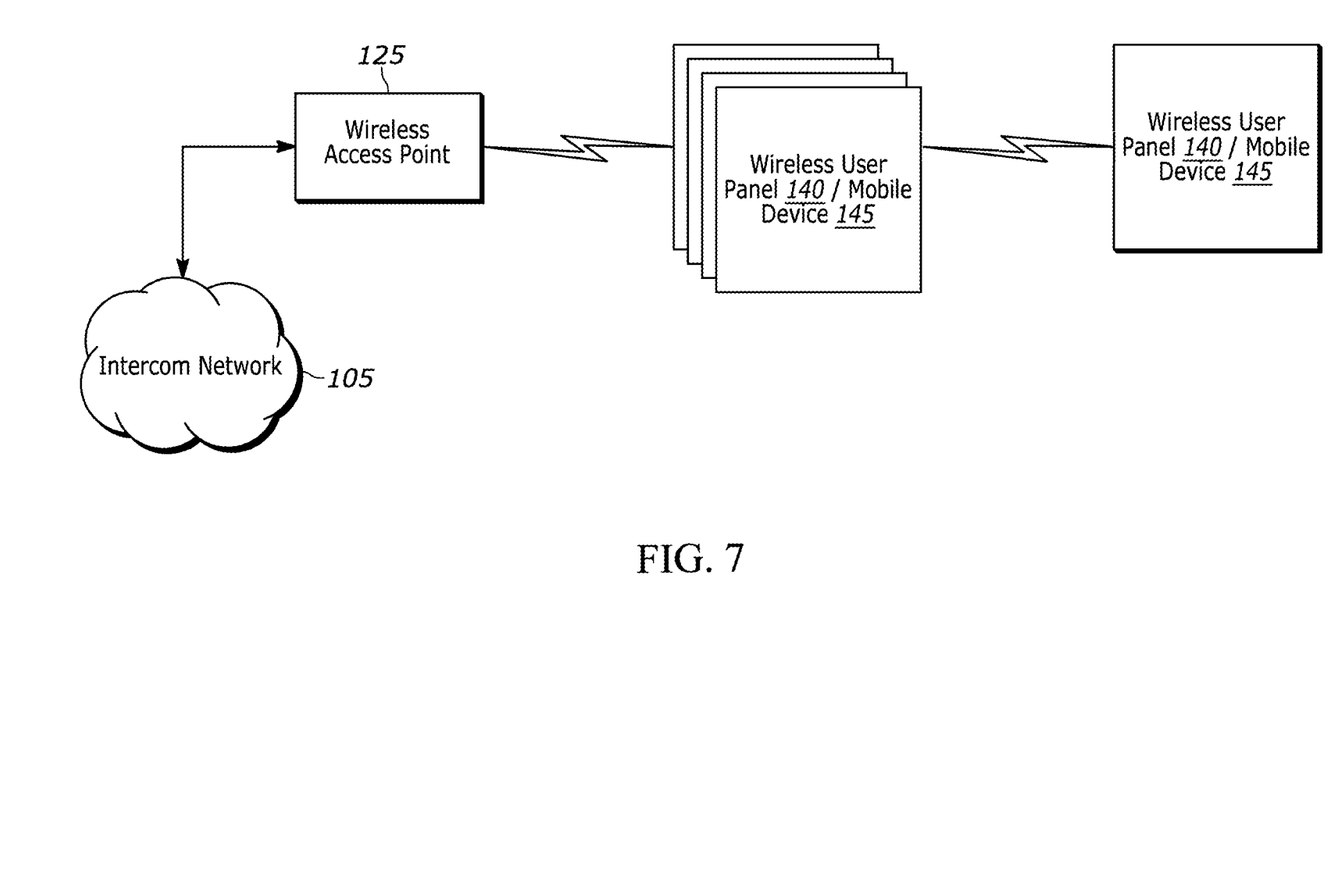
FIG. 7 is a block diagram of a wireless access point, a wireless user panel, and a mobile device of the intercom system of FIG. 1, according to some examples.

FIG. 7 is a block diagram of the wireless access point 125, the wireless user panel 140, and the mobile device 145 of the intercom system 100 of FIG. 1. In the example shown, the wireless access point 125 simultaneously relays audio and control signals to one or more mobile devices 145 and wireless user panels 140 over the first wireless connection. The wireless user panel 140 receives one or more audio streams from the matrix controller 110 via the wireless access point 125. The wireless access point 125 simultaneously transmits the one or more audio streams to the one or more mobile devices 145 over the first wireless connection. In some instances, the first wireless connection acts as a point-to-point connection between the wireless access point 125 and each of the one or more mobile devices 145 and wireless user panels 140. Both the broadcast point-to-point connection and broadcast point-to-multipoint connection may be used to create what is sometimes referred to as an interruptible foldback (IFB) functionality over the first wireless connection. As described above, the first wireless connection allows for the wireless user panel 140 or the mobile device 145 to broadcast the one or more audio streams to multiple receivers (e.g., one or more wireless user panels 140 and mobile devices 145). In some instances, the wireless access point 125 transmits the one or more audio streams directly to the one or more wireless user panels 140 and mobile devices 145 via the first wireless connection.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections.

Unless the context of their usage unambiguously indicates otherwise, the articles "a" and "an" should not be interpreted as meaning "one" or "only one." Rather these articles should be interpreted as meaning "at least one" or "one or more".

Relational terms, for example, first and second, top and bottom, and the like may be used herein solely to distinguish one entity or action from another entity or action without necessarily requiring or implying any actual such relationship or order between such entities or actions.

In some examples, method steps are conducted in an order that is different from the order described.

Thus, examples provide, among other things, systems and methods for registering devices with an intercom system. Various features, advantages, and examples are set forth in the following claims.

What is claimed is:

1. An intercom system, the system comprising:
  an intercom network;
  a user panel including
    a user panel wireless transceiver configured to establish wireless communications;
    a user panel short range communication transceiver configured to establish wireless communications;
    a user panel electronic controller communicatively coupled to the user panel wireless transceiver and the user panel short range communication transceiver;
  a wireless access point communicatively coupled with the intercom network via a first intercom interface, the wireless access point including
    an access point wireless transceiver configured to establish wireless communications;
    an access point short range communication transceiver configured to establish wireless communications;
    an access point electronic controller communicatively coupled to the access point wireless transceiver and the access point short range communication transceiver, the access point electronic controller configured to
      receive a user input, via the first intercom interface, to begin a registration mode;
      detect a first beacon signal via the access point short range communication transceiver from the user panel short range communication transceiver;
      determine whether the user panel has matching characteristics with the wireless access point;
      initiate a first wireless connection between the access point short range communication transceiver and the user panel short range communication transceiver in response to determining that the user panel has matching characteristics with the wireless access point;
      exchange identification information between the access point short range communication transceiver and the user panel short range communication transceiver; and
      register the user panel to the intercom network.

2. The intercom system of claim 1, wherein the access point electronic controller is configured to:
  disconnect the first wireless connection in response to registering the user panel to the intercom network.

3. The intercom system of claim 2, wherein the user panel electronic controller is configured to:
  transmit the first beacon signal via the user panel short range communication transceiver; and
  initiate a second wireless connection between the user panel wireless transceiver and the access point wireless transceiver in response to registering the user panel.

4. The intercom system of claim 3, wherein the user panel electronic controller is configured to:
  receive a firmware update via a temporary wireless connection.

5. The intercom system of claim 1, wherein the matching characteristics are at least one selected from the group consisting of a bandwidth, a connectivity strength, a signal sensitivity, and a universally unique identifier (UUID).

6. The intercom system of claim 1, further comprising:
  an external device communicatively coupled with the intercom network, the external device configured to receive the user input and transmit a signal indicative of the user input to the first intercom interface.

7. The intercom system of claim 1, further comprising:
  a mobile device communicatively coupled with the intercom network, the mobile device including a mobile device short range communication transceiver and an audio interface, the mobile device configured to:

initiate a third wireless connection between mobile device short range communication transceiver and the user panel short range communication transceiver;

transmit a control signal to the user panel via the third wireless connection; and exchange, via the user panel, control messages between the access point wireless transceiver and the user panel wireless transceiver based on the control signal.

8. The intercom system of claim 7, wherein the mobile device is configured to:

communicate, via the audio interface, audio signals via the third wireless connection.

9. The intercom system of claim 1, wherein the access point electronic controller is configured to:

determine a signal strength of the first beacon signal; and determine a distance from the wireless access point to the user panel based on the signal strength.

10. A method for registering a user panel to an intercom system via a wireless access point, the user panel including a user panel wireless transceiver, a user panel short range communication transceiver, and a user panel electronic controller, the wireless access point including an access point wireless transceiver, an access point short range communication transceiver, and an access point electronic controller, the method comprising:

receiving a user input, via the access point electronic controller, to begin a registration mode;

detecting, via the access point electronic controller, a first beacon signal at the access point short range communication transceiver from the user panel short range communication transceiver;

determining, via the access point electronic controller, whether the user panel has matching characteristics with the wireless access point;

initiating, via the access point electronic controller, a first wireless connection between the access point short range communication transceiver and the user panel short range communication transceiver in response to determining that the user panel has matching characteristics with the wireless access point;

exchanging, via the access point electronic controller, identification information between the access point short range communication transceiver and the user panel short range communication transceiver; and registering, via the access point electronic controller, the user panel to an intercom network.

11. The method of claim 10, further comprising:

disconnecting, via the access point electronic controller, the first wireless connection in response to registering the user panel to the intercom network.

12. The method of claim 11, further comprising:

transmitting, via the user panel electronic controller, the first beacon signal via the user panel short range communication transceiver; and initiating, via the user panel electronic controller, a second wireless connection between the user panel wireless transceiver and the access point wireless transceiver in response to registering the user panel.

13. The method of claim 12, further comprising:

receiving, via the user panel electronic controller, a firmware update from a temporary wireless connection.

14. The method of claim 10, further comprising:

initiating, via a mobile device, a third wireless connection between a mobile device short range communication transceiver and the user panel short range communication transceiver;

transmitting, via the mobile device, a control signal to the user panel via the third wireless connection; and exchanging, via the user panel, control messages between the access point wireless transceiver and the user panel wireless transceiver based on the control signal.

15. The method of claim 14, further comprising:

communicating, via an audio interface of the mobile device, audio signals via the third wireless connection.

16. The method of claim 10, further comprising:

determining, via the access point electronic controller, a signal strength of the first beacon signal; and determining, via the access point electronic controller, a distance from the wireless access point to the user panel based on the signal strength.

17. A method for logging into a user panel of an intercom system via a mobile device, the method comprising:

receiving, via the mobile device, a user input to create a new user;

transmitting, via the user panel, a first beacon signal from a user panel short range communication transceiver;

receiving, via the mobile device, the first beacon signal at a mobile device short range communication transceiver;

verifying, via the mobile device, information received via the first beacon signal;

initiating, via the mobile device, a first wireless connection between the user panel short range communication transceiver and the mobile device short range communication transceiver in response to the information received being verified;

transmitting, via the mobile device, identification information over the first wireless connection; and disconnecting, via the mobile device, the first wireless connection in response to exchanging the identification information.

18. The method of claim 17, further comprising:

retrieving, via the user panel, personalization settings of the new user from the intercom network.

19. The method of claim 18, wherein the personalization settings include at least one selected from the group consisting of key assignments, volume, microphone gain, and brightness.

\* \* \* \* \*